Figure 1:
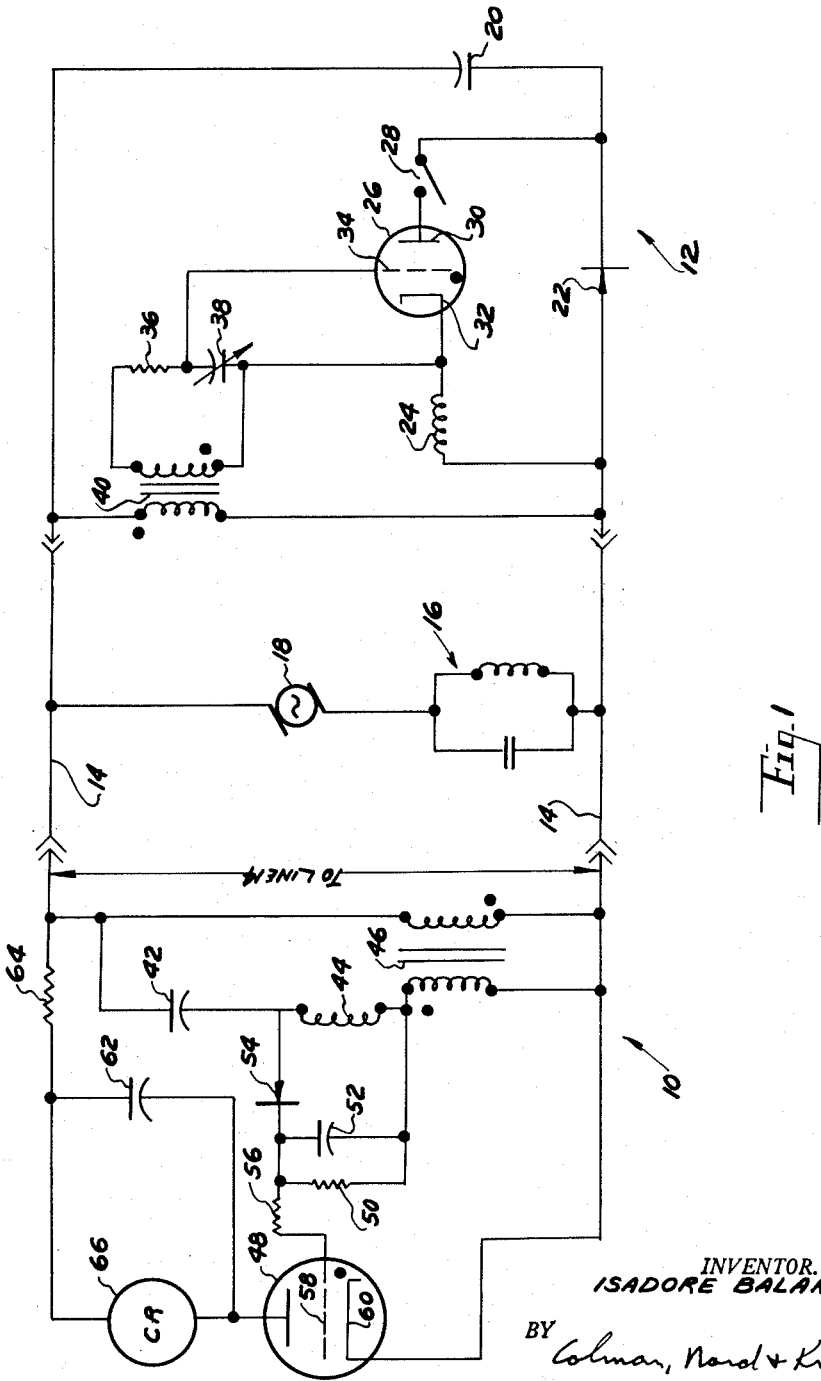

Nov. 28, 1961     I. BALAN     3,011,102
CONTROL SYSTEM

Filed Dec. 10, 1958     2 Sheets-Sheet 1

INVENTOR.
ISADORE BALAN.
BY Colman, Nord & Krass
ATTORNEYS

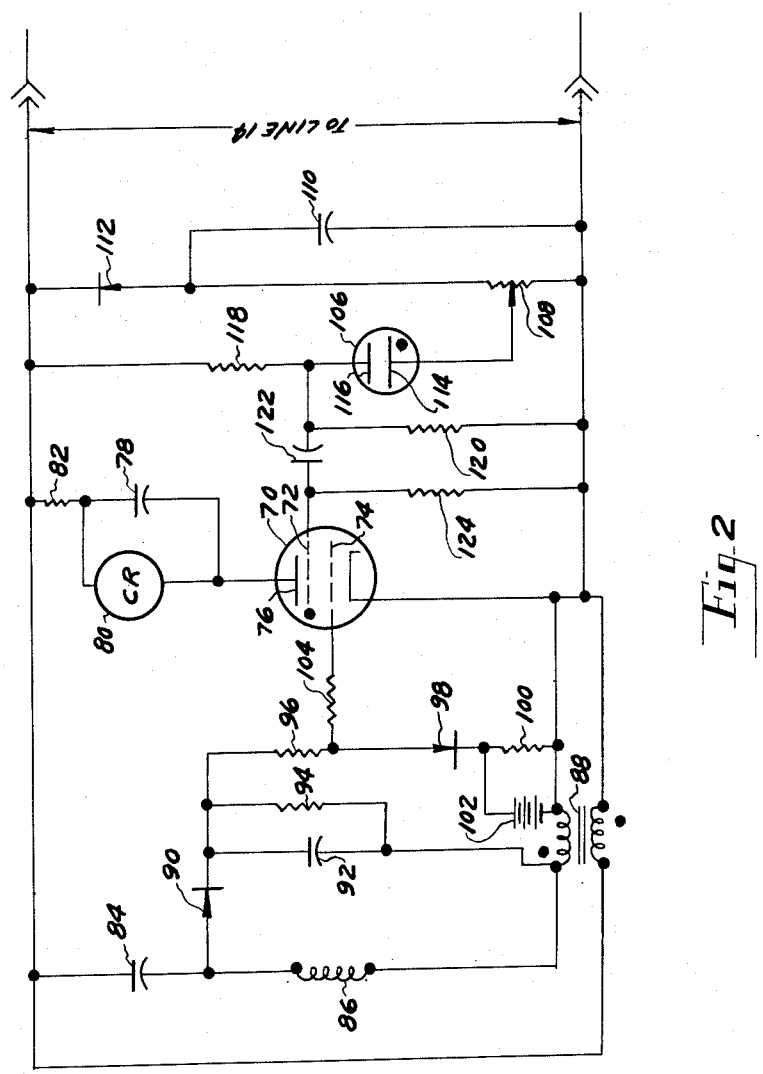

United States Patent Office 3,011,102
Patented Nov. 28, 1961

3,011,102
CONTROL SYSTEM
Isadore Balan, 18249 Robson, Detroit, Mich.
Filed Dec. 10, 1958, Ser. No. 779,336
7 Claims. (Cl. 317—149)

This invention relates to an electronic control system and more particularly to a carrier system for controlling the application of power to a load from a remote point.

Electronic devices which communicate with one another by superimposing a high frequency message signal on lines which carry lower frequency alternating current power are well known. Variations in these devices allow switching control of a load by means of a receiver which is connected to a transmitter through power lines.

This invention belongs to the latter class of devices and provides a novel, simple, and economical remote control switching system which utilizes low frequency electrical transmission lines for both interconnection and power.

In a preferred embodiment the present invention takes the form of a transmitter and receiver which are both connected to separated points on the same branch of a 60 cycle power system. For the purposes of the present invention a branch comprises those lines fed from the secondary of one power transformer. The transmitter utilizes a capacitor which is connected across the power lines in series with a rectifier. During that portion of the alternating current cycle in which the rectifier is conductive, the capacitor is charged to a voltage slightly below line maximum. The rectifier prevents this charge from being fed into the line as the alternating potential reverses. A switching device is shorted across the rectifier and is operative to connect the capacitor to the line at some selected point during the half cycle in which the rectifier is not conductive. The resultant discharge pulse reacts with the distributed inductance and capacitance of the line and the reactances of the power meter coils and transformed secondary to produce a damped, high frequency oscillation.

The receiver comprises a device which is responsive to the high frequency signal but not the low frequency of the power in such a manner as to actuate a switching device.

In this manner the low frequency power is used to both synchronize and energize the transmitter and receiver system, and the power lines themselves provide the connection between the transmitter and receiver.

It is therefore an object of the present invention to provide a remote control switching system utilizing low frequency power to charge a storage device which may be discharged into the line at a point in the alternating current cycle appropriate to the generation of a high frequency damped oscillation.

It is a further object of the present invention to provide a device of this type which utilizes the lumped and distributed reactances of the line in connection with the reactances of the device to form a tank circuit which generates a high frequency damped wave upon receipt of a voltage pulse from the transmitter.

A further object of the present device is to provide a receiver which is connected to the same power circuit as the transmitter and which detects the presence of the afore-mentioned damped wave oscillation and energizes a switching circuit while such waves continue.

Variations of the preferred embodiment may be provided in which several independent control systems are connected to the same power line through multiplexing techniques which utilize variations in the frequency of the damped waves or in the point in the alternating current cycle at which the damped wave is initiated in order to selectively provide communication from a single transmitter to a plurality of receivers or to allow several transmitter-receiver sets to be used on the same line.

Variations may also be employed in which the receiver is switched each time an impulse is provided from the transmitter rather than providing a continuous switching signal as long as the transmitter is operative.

Other advantages and applications of the present invention will be made apparent by the following detailed description of an embodiment of the invention and a variation thereon. The description makes reference to the accompanying drawings in which:

FIGURE 1 is a schematic representation of one embodiment of the control system; and FIGURE 2 is a schematic diagram of a receiver which may be used with the transmitter of the embodiment of FIGURE 1 in order to adapt it for multiplexing control.

The embodiment of FIGURE 1 comprises a transmitter section generally indicated at 12 and a receiver section generally indicated at 10 which are connected by a pair of alternating current power lines 14. Distributed inductance and capacitance of the power circuit and the lumped reactance of the elements in the power circuit such as the power meter coils and the transformer secondary are indicated by the elements 16. The power source is schematically illustrated by a generator 18 which is in series with the reactance across the line.

Referring to the transmitter portion of the circuitry a large capacitor 20 which is preferably of the non-electrolytic type is connected in series with a solid state rectifier 22 across the line. The rectifier is preferably of the selenium type. When the line which makes direct input to the rectifier 22 goes positive the rectifier conducts thereby charging the capacitor 20 to a voltage equal to full line voltage less the small drop across the rectifier 22. As the line connecting to the rectifier 22 begins to go negative the rectifier stops conducting thereby retaining a full charge on the capacitor 20.

The rectifier 22 is shorted by circuit which includes a choke 24, a gas filled thyratron 26 and a switch 28. During the initial discussion the switch 28 will always be considered in a closed position. The switch 28 connects directly to the plate 30 of the thyratron 26. The choke connects to the cathode of the tube 26. The grid 34 of the thyratron 26 is connected to the center of a phase shift circuit which includes a resistance 36 and a variable capacitor 38. These latter elements are connected in series across the secondary of a step-down transformer 40 which has its primary connected across the line.

The transformer 40 is connected to the line in such a manner as to provide a 180 degree phase shift at its secondary. By varying the capacitance 38 a phase shift may be obtained at the grid 34 of the thyratron 26 which is slightly greater than 180 degrees out of phase with the line.

Considering zero cycle time to occur when the line connecting to the rectifier 22 begins to go positive, the network feeding the grid 34 is such as to cause the grid to reach a potential at which the tube 26 fires at approximately 185 degrees; that is, just after the line feeding the rectifier 22 has passed through zero in the negative direction.

When the thyratron 26 fires capacitor 20 is discharged into the line through the thyratron and the choke 24. This voltage pulse reacts with the capacitance and inductance of the line and of the elements in the line to produce a relatively high frequency oscillation which damps in a short period of time compared to the low frequency cycle time. It has been found that with the average power circuit the main components of this damped wave lie in the region of 50 kilocycles, which is low enough to prevent radiation from the line which might disturb radio equipment. The choke 24 acts upon the damped wave so as to suppress most frequencies above 75 kilocycles.

When the cathode 32 of the tube 26 goes negative with respect to the plate 30 the grid regains control of the tube and it remains in non-conductive condition until the appropriate point in the next cycle is reached.

In the receiver section of the circuitry 10, a capacitor 42 and a choke 44 are connected in series with the secondary of a transformer 46 directly across the line. The capacitor 42 and the choke 44 basically comprise a high pass filter which passes the high frequency oscillation associated with the transmitter impulse but prevents the passage of the power frequency.

The secondary of the transformer 46 also provides power for the filament of a receiver thyratron 48. The secondary of the transformer 46 is connected to the choke 44 in such a manner so as to provide a signal which is 180 degrees out of phase with the line voltage.

A resistor 50 and a capacitor 52 are both shunted across the choke 44 in series with a solid state rectifier 54. The three elements 50, 52 and 54 act to remodulate the signal across the choke 44 by rectifying and filtering it. Their common point is applied to a resistor 56 which connects to the grid 58 of the thyratron 48 and acts to limit the current passing through the grid.

The combination of the voltage provided by the secondary of the transformer 46 is added to the voltage across the choke 44 in creating the grid to cathode voltage of tube 48, since the cathode 60 of the tube is connected to the other end of the transformer 46. The parameters of the tube 48 and the voltages of the circuit are such that when the grid has control of the tube 48 it will fire when the voltage provided by a transmitter impulse is added to the voltage of the secondary of the transformer 46.

A capacitor 62 and a resistance 64 are connected in series in the plate circuit of the thyratron 48. The capacitor 62 is shunted by the coil of a control relay 66. The contacts of the control relay 66 provide the controlled output of the device.

When the transmitter 12 is operative to provide pulses to the line the receiver thyratron 48 begins to conduct at very nearly the same point in the alternating current cycle as the transmitter pulse is emitted. It continues to conduct until the line voltage on its plate begins to go negative. During this period of time the capacitor 62 is charged. During the next half cycle it discharges into the line through the resistance 64. The parameters of the capacitor 62 and the resistance 64 are such that the capacitor 62 does not reach a full charge during one cycle of conduction of the tube 64 and does not fully dissipate that charge into the line through the resistance on the next half cycle. Therefore the charge on the capacitor 62 builds up during two or more half cycles of conduction of the tube 48 until a full charge is reached.

The relay 66 is designed in such a manner that it will not pull in its armature until the charge on the capacitor 62 has built up through several cycles. In this manner the receiver is protected against closures of the relay 66 which might occur from discharges into the line from other devices which only last for a short period of time.

Two sets of transmitters and receivers may be utilized on the same branch of a power line by controlling the manner in which the units are connected to the line. Thus, in order for a pair to be operative it is necessary that the cathodes of both thyratrons be connected to the same side of a line. This is required so that the anode of the receiver thyratron 48 will be positive during the half cycle in which a pulse is received from the transmitter, that is, the same half cycle during which the transmitter anode 30 is positive. Were these connections reversed the receiver 10 would provide a voltage pulse to the grid 58 of the thyratron 48 while the anode of that tube was negative so that the tube would not fire. If the transmitter and receiver are connected to opposite legs of a 220 volt three line system which utilizes a center tap transformer it is necessary that the anode of one unit and the cathode of the other unit be connected to the center line since the voltages in the outside lines are at 180 degrees with respect to each other. It should be understood that these polarity relationships only exist for a receiver and transmitter combination of the type shown in FIGURES 1 and 2 which both utilize thyratron tubes. If this condition does not exist the transmitter will have no effect on the receiver. Thus, two sets of transmitter receivers can be used on the same branch without interaction between them.

Similarly, one transmitter can be used to control any number of receivers by connecting them into the line in an appropriate manner.

When it is desired to place more than two sets of transmitter receivers on the line or alternatively to selectively control any one of a number of receivers from the same transmitter it is necessary to exercise control over either the frequency of a transmitter receiver pair or the point in the alternating current cycle at which the transmitter fires. With the latter system units must be provided in the receivers which respond to transmitter pulses at particular points in the alternating current cycle. Control of a point at which the transmitter fires may be simply accomplished by varying the position of the capacitor 38. This shifts the phase of the voltage to the grid 34 of the transmitter thyratron 26 and thus varies the point in the cycle at which it fires.

A receiver which is sensitive to the exact point in the alternating current cycle at which the transmitter emits its pulse is illustrated in FIGURE 2. It utilizes a thyratron 70 which has a screen grid 72 in addition to its control grid 74. The plate of the tube 76 is connected to a parallel combination of a capacitor 78 and a control relay coil 80 which connect to the line through a resistance 82 and perform the same functions as the elements 62, 64 and 66 in the receiver of FIGURE 1.

The circuit which connects to the control grid 74 includes a high pass filter comprising a capacitor 84, a choke 86 and the secondary of a step-down transformer 88. These units perform the same function as the elements 42, 44 and 46 in the receiver of FIGURE 1. The mid-point of the capacitor 84 and the choke 86 connect to a solid state rectifier 90 which acts with the shunt capacitor 92 and resistance 94 to demodulate the high frequency control signal.

Up to this point the circuitry is similar to that of the receiver in FIGURE 1. However, in order to control the point at which the receiver fires, it is necessary to insure that the signal on the control grid 74 is always uniform when the transmitter fires and does not vary greatly as changes are made in the reactance of the line. This is done by a clipper which includes a resistor 96, a solid state rectifier 98, a second resistor 100 and a small dry battery 102 or other source of low voltage. The battery 102 is connected to the rectifier 98 in such a manner to reverse bias it so that it is not conductive until the voltage at its input from the resistor 96 exceeds a particular value. When this occurs it begins to conduct and thereby maintains the voltage at the resistance 96 at a set value. This circuitry, which connects to the control grid 74 through a current limiting resistor 104, prevents the grid voltage from exceeding the value determined by the battery 102. This voltage is kept low enough so that it reaches this maximum whenever a signal is sent by the transmitter, independent of line conditions.

The screen grid 72 is fed by circuitry which centers about a neon glow tube 106. This tube has one of its plates fed by a potentiometer 108 which is shunted across a capacitor 110. The capacitor 110 is in series with a rectifier 112 across the line. The rectifier 112 is connected so as to charge the capacitor 110 with a negative voltage at their common terminal. A portion of this voltage is applied to the plate 114 of the neon glow tube 106 by means of the potentiometer 108. The other plate 116 of the glow tube is connected to a line through a voltage divider consisting of a resistance 118 and a resistance 120. The plate 116 also connects to the screen grid 72 of the tube 70 through a high pass filter which comprises a capacitor 122 and a resistor 124. By varying the potentiometer 108, the point in the alternating cycle at which the neon glow tube 106 breaks down may be controlled. The filter 122 and 124 admits the higher frequency components of this breakdown surge to the screen grid 72 but blocks the lower frequency power components.

The parameters of the circuit are such that the thyratron 70 will only fire when the voltage on its control grid 74 has reached the maximum value allowed by the clipper and the screen grid 72 receives a voltage surge from the breakdown of the neon glow tube 76. When either of these voltages are present alone, the thyratron 70 will not fire.

In this manner it is possible to synchronize a particular transmitter-receiver pair by controlling the point in the cycle at which the transmitter emits a pulse through adjustment of capacitor 38 or some similar method and tuning a particular receiver to that point by controlling the breakdown point of the neon glow tube 106. Thereby three or more transmitter-receiver pairs may be used on the same branch of a power system without interference with one another.

It is also possible to multiplex several transmitter-receiver pairs by using filters to control the frequencies which are emitted by a transmitter and other filters to control the voltage that is fed to the grid of a receiver thyratron.

When two or more sets of transmitter-receiver pairs are to be operated in separate but adjacent locations such as in two homes which receive power from the same power transformer secondary, it is possible to isolate one from the other through the use of blocking filters between their lines.

In another embodiment a latching relay is substituted for the control relay so that the transmitter need not be continuously operative to maintain the control relay in a closed position. Rather a first pulse from the transmitter closes the control relay and a later pulse which may come at any time opens the control relay.

It is to be understood that the scope of my invention is not to be limited by the particular circuitry of the aforegoing embodiments but is rather to be defined by the following claims.

I claim:

1. A remote control switching system for use in connection with a low-frequency alternating current power line, comprising: a transmitter including a capacitor, a rectifier connected in series with said capacitor across said power line, a trigger device shunting said rectifier and being operative to connect said capacitor to said power line at a point during the half of the alternating current cycle in which the rectifier is non-conductive whereby a high frequency transient oscillation is generated by the interaction of the charge on such capacitor with the impedances associated with the line; and a receiver including a relay, a filter operative to separate the high frequency transient components from the low frequency power components, and a trigger device operative to receive the high frequency components from the said filter and actuate said relay upon such receipt.

2. A remote control switching system for use in connection with a low frequency alternating current power line, comprising: a transmitter including means for storing an electrical charge, a rectifier connected in series with said charge storage means across said power line, and a first trigger device operative to connect said storage means to said power line at a point in the alternating current cycle at which the rectifier is non-conductive, whereby the charge in the storage system reacts with the impedances associated with the line to form a high frequency damped wave oscillation; and a receiver, located on said power line at a point physically separated from said transmitter and including a relay, a filter for separating said high frequency damped wave oscillation from the low power components, and a trigger device connected to said filter device and being operative to activate said relay upon receipt of a high frequency damped wave oscillation.

3. A remote control switching unit for use in connection with a low frequency alternating current power line, comprising: a transmitter including a capacitor, a rectifier connected in series with said capacitor across the line, a thyratron having its cathode-anode circuit shunting said rectifier, a phase shift and voltage reduction circuit connected so as to apply a voltage lower than line voltage to the control grid of said thyratron with its phase shifted with respect to that of line voltage in such a manner as to fire said thyratron at a point in the alternating current cycle in which said rectifier is non-conductive, whereby a high frequency damped wave oscillation is created by the interaction of the charge on said capacitor with the impedances associated with the line; and a receiver, located on said power line at a point physically remote from said transmitter, and including, a relay, a thyratron, connected in series with said relay across the line, and a trigger circuit operative to sense the presence of said high frequency damped wave oscillation and to trigger said thyratron upon such occurrence, whereby said relay is actuated.

4. A remote control switching system for use in connection with an alternating current power line, comprising: a transmitter including a capacitor, a rectifier in series with said capacitor across said line, a trigger circuit shunted across said rectifier, means controlled by said alternating current power for actuating said trigger at a point in the alternating current cycle at which said rectifier is non-conductive, whereby said capacitor discharges into said line causing a high frequency damped wave oscillation to occur; and a receiver including a control relay, and a trigger operative to actuate said relay upon the occurrence of said damped wave oscillations.

5. A remote control switching system for use with a low frequency alternating current power line, comprising: a transmitter including a capacitor, a rectifier connected in series with said capacitor across said line, a trigger shunting said capacitor, and means controlled by said alternating current power for actuating said trigger at a predetermined point in the half of the alternating current cycle during which said rectifier is inoperative, whereby the charge upon said capacitor is connected to said line developing a high frequency damped wave oscillation; and a receiver, located on such power line at a point physically separated from said transmitter and including a control relay, a thyratron having a control grid and a screen grid, the anode-cathode circuit of said thyratron being connected in series with said control relay across said line, a filter connected across said line operative to select the high frequency components of the signals across that line, a limiter connecting said filter to one of the grids of said thyratron, and means connected to the other of said grids for providing a voltage at a particular point in said alternating current cycle, whereby said receiver may be adjusted so as to actuate said relay only upon receipt of oscillations generated at a particular point in said alternating current cycle.

6. A remote control switching unit for use in connection with a low frequency alternating current power line, comprising: a transmitter including a capacitor, a rectifier connected in series with said capacitor across the line, a uni-directional gating device having a cathode, an anode, and a gate, having its cathode-anode circuit shunting said rectifier, a phase shift and voltage reduction circuit connected so as to apply a voltage lower than line voltage to the control grid of said uni-directional gating device with its phase shifted with respect to that of line voltage in such a manner as to fire said gating device at a point in the alternating current cycle at which said rectifier is non-conductive, whereby a high frequency damped wave oscillation is created by the interaction of the charge on said capacitor with the impedances associated with the line; and a receiver, located on said power line at a point physically remote from said transmitter, and including a relay, a second uni-directional gating device connected in series with said relay across the line, and a trigger circuit operative to sense the presence of said high frequency damped wave oscillation and to trigger said second gating device on such occurrence, whereby said relay is then actuated.

7. A remote control switching system for use with a low frequency alternating current power line, comprising: a transmitter including a capacitor, a rectifier connected in series with said capacitor across said line, a trigger shunting said capacitor, and means controlled by said alternating current power source for actuating said trigger at a predetermined point in the half of the alternating current cycle during which said rectifier is inoperative, whereby the charge upon said capacitor is connected to said line developing a high frequency damped wave oscillation; and a receiver, located on such power line at a point physically separated from said transmitter and including a control relay, a uni-directional gating device having an anode, a cathode, and a grid, said gating device having its anode-cathode circuit in series with said control relay across said line, a filter connected across said line operative to select the high frequency components of the signals across the line, means for generating a voltage pulse at a particular point in said alternating current cycle, and means, connected to the gate of said uni-directional conductive device, operative to fire said device upon receipt for an appropriate voltage from said filter and from said means for providing a voltage at a particular point in said alternating current cycle, whereby said receiver may be adjusted so as to actuate said relay only upon receipt of oscillations generated at a particular point in said alternating current cycle.

References Cited in the file of this patent

UNITED STATES PATENTS

| | | |
|---|---|---|
| 2,297,816 | Torkelson | Oct. 6, 1942 |
| 2,483,053 | Isay | Sept. 27, 1949 |
| 2,580,539 | Goodwin | Jan. 1, 1952 |
| 2,698,888 | Coe | Jan. 4, 1955 |
| 2,915,743 | Stewart et al. | Dec. 1, 1959 |